United States Patent [19]

Khoe et al.

[11] Patent Number: 4,671,609

[45] Date of Patent: Jun. 9, 1987

[54] COUPLING MONOMODE OPTICAL FIBER HAVING A TAPERED END PORTION

[75] Inventors: Giok D. Khoe; Josephus H. F. M. Poulissen; Henricus M. De Vrieze, all of Eindhoven, Netherlands

[73] Assignee: U.S. Philips Corporation, New York, N.Y.

[21] Appl. No.: 559,588

[22] Filed: Dec. 8, 1983

[30] Foreign Application Priority Data

Dec. 23, 1982 [NL] Netherlands .......................... 8204961

[51] Int. Cl.⁴ ............................................. G02B 6/32
[52] U.S. Cl. ............................... 350/96.18; 350/96.15; 350/96.29; 350/320
[58] Field of Search ............... 350/96.15, 96.16, 96.18, 350/96.20, 96.29, 96.30, 320; 65/3.11, 3.12

[56] References Cited

U.S. PATENT DOCUMENTS

| | | | |
|---|---|---|---|
| 4,067,937 | 1/1978 | Unno et al. | 264/1 |
| 4,118,270 | 10/1978 | Pan et al. | 350/96.18 X |
| 4,193,663 | 3/1980 | Timmermann | 350/96.18 |
| 4,269,648 | 5/1981 | Dakss et al. | 350/96.18 X |
| 4,380,365 | 4/1983 | Gross | 350/96.18 |
| 4,400,055 | 8/1983 | Ozeki et al. | 350/96.15 |

FOREIGN PATENT DOCUMENTS 54-2758  1/1979  Japan .................. 350/96.18
1480616  7/1977  United Kingdom .

OTHER PUBLICATIONS

Murakami et al, "Microlens Tipped on a Single-Mode Fibre End for . . . ", *Electronics Lett.*, vol. 16, No. 9, Apr. 1980, pp. 321-322.

D'Auria et al, "High Index Microlenses for GaAlAs Laser-Fibre Coupling", *Electronics Lett.*, vol. 16, No. 9, Apr. 1980, pp. 322-344.

Kuwahara et al, "Efficient Coupling from Semiconductor Lasers into Single-Mode Fibers . . . ", *Applied Optics*, vol. 19, No. 15, Aug. 1980, pp. 2578-2583.

Cohen et al, "Microlenses for Coupling Junction Lasers to Optical Fibers", *Applied Optics*, vol. 13, No. 1, Jan. 1974, pp. 89-94.

*Primary Examiner*—John Lee
*Attorney, Agent, or Firm*—Marc D. Schechter

[57] ABSTRACT

A monomode optical transmission fiber with a tapered end portion. A lens is arranged on the end portion. The lens has a refractive index higher than that of the fiber core. Such a fiber has a substantially better coupling efficiency from a diode laser into the fiber core. The lens can be formed by immersing the tapered end portion of the fiber in a transparent liquid material. The drop formed on the end portion of the fiber after withdrawal from the liquid solidifies into a lens.

14 Claims, 7 Drawing Figures

COUPLING MONOMODE OPTICAL FIBER HAVING A TAPERED END PORTION

BACKGROUND OF THE INVENTION

The invention relates to a monomode optical transmission fiber having an end portion with a tapered core and cladding. The invention also relates to a method of manufacturing such a fiber.

Such a fiber and method are described in an article by H. Kuwahara et al entitled "Efficient coupling from semiconductor lasers into single-mode fibers with tapered hemispherical ends", (Applied Optics, Vol. 19, No. 15, August 1980, pages 2578-2583). The tapered end portion of the transmission fiber described in this article has a rounded tip with a diameter of approximately 25 microns. This tip acts as a lens. As described in the article, transmission fibers having tapered cores and claddings, have substantially better coupling efficiency, higher permissible misalignment of the fiber relative to the radiation source (a diode laser), and reduced feedback of radiation to the radiation source (as a result of reflections inside the fiber) as compared with transmission fibers having straight and flat end portions.

The coupling efficiency is to be understood to mean the quotient of the radiation intensity received from the source by the transmission fiber divided by the total radiation intensity emitted by this source.

As a result of refection, a part of the radiation emitted by the diode laser may return into the laser. This feedback radiation may give rise to undesirable modulation of the radiation intensity emitted by the diode laser.

The coupling efficiency attainable by a tapered monomode transmission fiber, which is approximately 25 to 30%, is higher than that of a transmission fiber with a straight and flat end portion. However, this coupling efficiency is still inadequate for practical purposes. The cause of this low coupling efficiency is the fact that the refractive index of the fiber end portion is comparatively low, namely equal to that of the fiber core, consequently, the lens formed by this end portion has a comparatively low numerical aperture and exhibits comparatively large spherical aberration.

SUMMARY OF THE INVENTION

It is an object of the present invention to increase the coupling efficiency of a tapered monomode transmission fiber.

According to the invention, a transparent material with a convex surface is deposited on the tapered end portion of a monomode fiber. The material has a refractive index which is substantially higher than that of the fiber core.

The deposited material forms a lens whose numerical aperture is substantially higher than that of the known transmission fiber with a tapered end portion.

It is to be noted that German Patent Application No. 2,535,161 (corresponding to U.K. Pat. No. 1,480,616) describes a transmission fiber with a lens formed of a homogeneous and transparent material with a spherical surface. However, the core of the transmission fiber disclosed in this German Patent Application does not have a tapered end portion. Hence, this transmission fiber does not combine the advantage of a lens arranged on the fiber end with the advantages of a tapered core. Moreover, German Patent Application No. 2,535,161 does not state that the refractive index of the additional material deposited on the fiber end portion must be greater than that of the fiber core for high transmission efficiency. Finally, German Patent Application No. 2,535,161 relates to a multimode transmission fiber, and not to a monomode fiber.

In one embodiment of the monomode transmission fiber, the material with the convex surface is glass.

The lens on the end of the transmission fiber may be of a homogeneous glass. An antireflection coating may be deposited on the convex outer surface of the lens.

In another embodiment of the lens, the refractive index of the material exhibits a specific gradient from the convex outer surface toward the inner surface.

According to a further feature of the monomode transmission fiber, the lowest refractive index of the lens material is approximately 1.9. The refractive index of the fiber core is approximately 1.5.

In another embodiment of the transmission fiber, the length of the tapered end portion is on the order of magnitude of the diameter of the untapered fiber portion. Such a transmission fiber has a better coupling efficiency than a transmission fiber whose tapered end portion is substantially longer, such as the transmission fiber described in the article by Kawahara et al, above.

The lens material may be deposited on a round end of the tapered fiber. In a preferred embodiment of the monomode transmission fiber, the lens material is deposited on a flat end face of the tapered end portion of the transmission fiber.

It is to be noted that both German Patent Application No. 2,535,161 and German Patent Application No. 2,630,632 (corresponding to U.S. Pat. No. 4,067,937) describe arranging a plano-convex lens on a flat end face of a transmission fiber. However, Patent Application No. 2,630,632 describes a transmission fiber whose core has an untapered end portion instead of a tapered end portion. Moreover, this Patent Application states that the refractive index of the lens is preferably smaller than that of the fiber material.

Another aspect of the invention concerns the method of manufacturing the monomode transmission fiber. As described in the by Kuwahara et al, a monomode optical transmission fiber with a tapered end portion can be obtained by stretching a straight transmission fiber in an arc discharge until it fractures. According to the invention, the tapered end portion is then immersed in a transparent liquid material having a refractive index which is higher than that of the fiber core. The tapered end portion is withdrawn from the liquid material and the material which adheres to the fiber end is allowed to solidify to form a stable lens shape.

Preferably a flat end face is formed on the tapered end portion before the tapered end portion is immersed into the liquid material.

DESCRIPTION OF THE PREFERRED EMBODIMENTS

Figure 1:
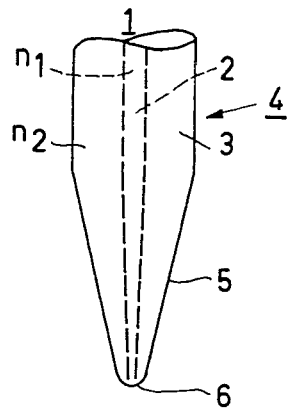
FIG. 1 is a side view of a known monomode transmission fiber having a tapered end portion.

The transmission fiber 1 shown in FIG. 1 comprises a core 2 and a cladding 3. The refractive index of the core material is slightly higher than that of the cladding material, so that most of the light entering the fibre core 2 is guided through the core by total reflection at the core-to-cladding interface. The refractive index $n_2$ of the cladding material is, for example, 1.5. The refractive index $n_1$ of the core material is, for example, approximately 0.3% higher.

The transmission fiber described here is a monomode fiber. This means that only radiation in a specific mode can propagate in the fiber core. In such a fiber, the core diameter is substantially smaller than the cladding diameter. For example, the core diameter is approximately 7 microns and the cladding diameter is approximately 125 microns.

The portion 4 of the transmission fiber 1 is straight. The end portion 5, however, has a tapered core and cladding and has a rounded tip 6. The rounded tip is obtained automatically when stretching a straight transmission fiber in an arc discharge until the straight fiber breaks. The shape of the tapered portion and the radius of the rounded tip 6 are determined by the speed of stretching. The round tip has a radius of, for example, 12.5 microns and exhibits lens action.

Figure 2:
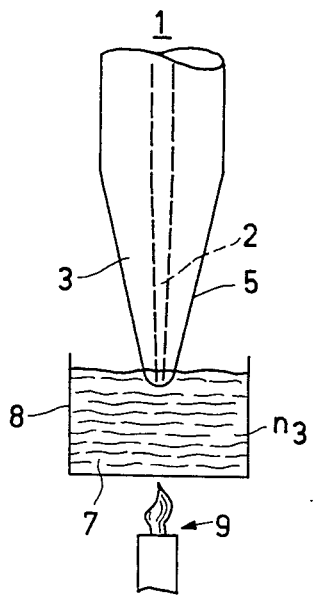
FIG. 2 schematically illustrates the inventive method of forming a lens on an end of a fiber.

According to the invention, in order to increase the coupling efficiency, a lens having a high refractive index is arranged on the end portion 5 of the fiber. A lens having a high refractive index generally has a large numerical aperture and low spherical aberration. Such a lens is formed by immersing the end portion 5 of fiber 1 in a liquid or viscous material 7, as is schematically shown in FIG. 2.

The material 7 is suitably a glass which has been melted in a crucible 8, as is schematically indicated by the flame 9. The material 7 is a soft glass, so that the fiber end 5 is not deformed upon immersion. The material 7 has a refractive index $n_3$ which is higher than that of the fiber core material.

A satisfactory result is obtained by depositing glass with a refractive index $n_3=1.9$ on a fiber with $n_2=1.5$. The glass is, for example, of the SF 59 type. The type of glass chosen for the lens must be one whose refractive index does not decrease substantially during softening and subsequent cooling.

When the fiber end is withdrawn from the crucible, a part of the material 7 will adhere to the fiber. As a result of surface tension, this material will adopt a specific drop shape, designated 10 in FIGS. 3a, 3b and 3c, at a specific viscosity. The dimensions and the shape of this drop can be influenced by the immersion depth and the temperature of the material 7 in the crucible 8. Moreover, the shape of the end portion 5 of the fiber will also determine the shape of the drop 10.

After the fiber end 5 with the drop 10 has been withdrawn from the material 7, the drop, if it is made of glass, is allowed to cool. In this way a lens 10 is formed on the fiber end.

Figure 3A:
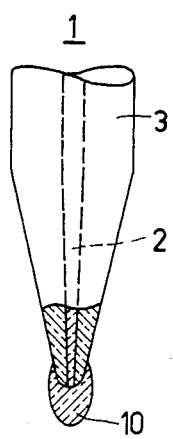
FIGS. 3a, 3b and 3c are side views, partly in cross-section, of three different embodiments of transmission fibers obtained by the inventive method.
Figure 3B:
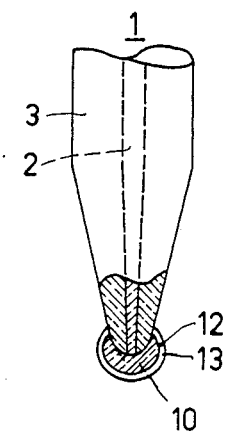
Figure 3C:
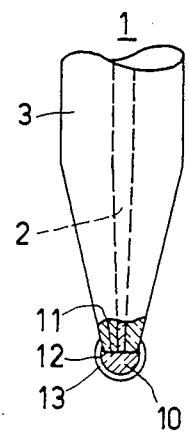

FIGS. 3a, 3b and 3c show embodiments of a transmission fiber with such a lens 10. FIG. 3a shows a transmission fiber with a comparatively long lens 10, which is obtained by immersing the fiber end comparatively deeply into the crucible 8. The lens 10 may also be formed in layers by immersing the fiber several times in the crucible 8. The lens material is allowed to cool between consecutive immersions.

FIG. 3b shows an embodiment with a comparatively thin lens which is obtained by immersing only a small portion of the fiber end in the crucible.

Finally, FIG. 3c shows a preferred embodiment. The lens 10 is now formed on a flat end face 11 of the transmission fiber. In order to obtain such a flat end face the fiber shown in FIG. 1, which is manufactured in known manner, is cut at a specific section along the tapered portion 5.

Figure 4A:
FIGS. 4a and 4b illustrate how to produce a transmission fiber with a tapered end portion with a flat end face.
Figure 4B:
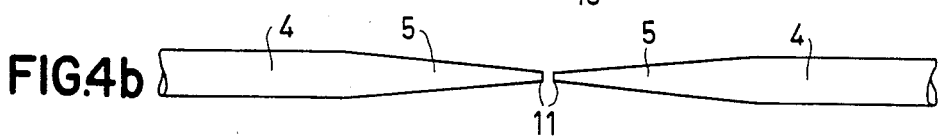

FIG. 4a schematically illustrates a method which is preferably used in order to obtain a tapered transmission fiber with a flat end face. Again a straight transmission fiber is first heated and then stretched over a specific length. The fiber 14 is scratched at 16 by a scriber 15 of a circle-cutting apparatus. Subsequently, the fiber 14 is put into tension until it breaks. The fracture surface is a flat surface at the location of the scratch. Thus, two tapered fibers 4 with flat end faces are obtained, as shown in FIG. 4b.

When the straight transmission fiber is stretched, it is possible to pull at both ends of this fiber. However, it has been found that a better result is obtained if one end of the straight fiber is stationary relative to the heat source and only the other end of the fiber is pulled. Of the fiber portions obtained after fracture of the stretched fiber, the stationary portion has a substantially shorter tapered end portion (for example 125 microns) than the fiber portion which has been pulled. The transmission fiber with the shorter tapered end portion has a higher coupling efficiency than the transmission fiber with the longer tapered end portion.

The lens which is obtained by the method illustrated in FIG. 2 is made of a homogeneous material with a comparatively high refractive index. The surface of this lens may reflect a part of the incident light. In order to reduce reflection losses, an antireflection coating 13 may be applied to the outer surface 12 of the lens 10, as shown in FIGS. 3b and 3c.

Reflection loss may also be reduced by giving the lens 10 a graded refractive index (graded from the spherical outer surface toward the inner surface). For this purpose, the lens 10 may, for example, be immersed in a salt solution which induces ion exchange between the lens and the salt solution so that a graded index lens is obtained. The lowest refractive index in the lens 10 is then still substantially higher than the refractive index of the transmission fiber core.

A practical embodiment of a transmission fiber has a core diameter of approximately 7 microns, a cladding diameter of approximately 125 microns and a refractive index of approximately 1.5. The transmission fiber also has a short tapered end portion with a flat end face on which a graded index lens is formed. The lens has a diameter of approximately 30 microns and a minimum refractive index of approximately 1.9 a coupling efficiency of more than 60% was achieved with such a fiber.

What is claimed is:

1. A monomode optical fiber comprising:
   an end portion having a core and a cladding, said core having a refractive index, said end portion being tapered; and
   a transparent lens on the tapered end portion, said lens having an inner surface adjacent the end portion and having a convex outer surface, said lens having a refractive index gradient which extends from the outer surface toward the inner surface, the refractive index of the lens being greater than the refractive index of the core.

2. A monomode optical fiber as claimed in claim 1, characterized in that the lens is made of glass.

3. A monomode optical fiber as claimed in claim 2, characterized in that:
the minimum refractive index of the lens is approximately 1.9; and
the refractive index of the core is approximately 1.5.

4. A monomode optical fiber as claimed in claim 3, characterized in that:
the fiber has an untapered portion with a diameter; and
the tapered end portion has a length on the order of magnitude of the diameter of the untapered portion.

5. A monomode optical fiber as claimed in claim 4, characterized in that:
the tapered end portion of the fiber has a flat end face; and
the lens is provided on the flat end face.

6. A monomode optical fiber comprising:
an end portion having a core and a cladding, said core having a refractive index, said end portion being tapered; and
a transparent lens on the tapered end portion, said lens having a refractive index which is greater than the refractive index of the core.

7. A monomode optical fiber as claimed in claim 6, characterized in that the lens is made of glass.

8. A monomode optical fiber as claimed in claim 7, characterized in that the lens is homogeneous.

9. A monomode optical fiber as claimed in claim 8, characterized in that:
the refractive index of the lens is approximately 1.9; and
the refractive index of the core is approximately 1.5.

10. A monomode optical fiber as claimed in claim 9, characterized in that:
the fiber has an untapered portion with a diameter; and
the tapered end portion has a length on the order of magnitude of the diameter of the untapered portion.

11. A monomode optical fiber as claimed in claim 8, characterized in that:
the lens has an outer surface; and
the lens comprises an antireflection coating on its outer surface.

12. A monomode optical fiber as claimed in claim 11, characterized in that:
the tapered end portion of the fiber has a flat end face; and
the lens is provided on the flat end face.

13. A method of manufacturing a monomode optical fiber, said method comprising the steps of:
heating a portion of a monomode optical fiber;
pulling on the optical fiber from one side of the heated portion while maintaining the fiber stationary on the other side of the heated portion to stretch the heated fiber until the fiber fractures to produce two fibers each with a tapered end portion, one tapered end portion being shorter than the other;
immersing a tapered end portion is a transparent liquid material having a refractive index higher than a refractive index of the fiber core;
withdrawing the tapered end portion from the liquid while leaving a drop of liquid material on the tapered end portion; and
allowing the drop of liquid to solidify to form a solid lens on the tapered end portion.

14. A method of manufacturing a monomode optical fiber, said method comprising the steps of:
heating a portion of a monomode optical fiber;
pulling on the optical fiber from both sides of the heated portion to stretch the heated fiber until the fiber fractures to produce two fibers each with a tapered end portion;
immersing a tapered end portion in a transparent liquid material having a refractive index higher than a refractive index of the fiber core;
withdrawing the tapered end portion from the liquid while leaving a drop of liquid material on the tapered end portion; and
allowing the drop of liquid to solidify to form a solid lens on the tapered end portion.

* * * * *

UNITED STATES PATENT AND TRADEMARK OFFICE
CERTIFICATE OF CORRECTION

PATENT NO. : 4,671,609

DATED : June 9, 1987

INVENTOR(S) : GIOK D. KHOE ET AL

It is certified that error appears in the above-identified patent and that said Letters Patent is hereby corrected as shown below:

Claim 13, line 11 (Column 6, line 24) "is" should read --in--.

Signed and Sealed this

Thirteenth Day of October, 1987

Attest:

DONALD J. QUIGG

Attesting Officer

Commissioner of Patents and Trademarks